United States Patent [19]

Shimoda

[11] Patent Number: 4,656,972
[45] Date of Patent: Apr. 14, 1987

[54] METHOD AND APPARATUS FOR REDUCING NO$_x$ IN EXHAUST GASES FROM FLUIDIZED-BED BOILER

[75] Inventor: Hiromi Shimoda, Hasuda, Japan

[73] Assignee: Ishikawajima-Harima Jukogyo Kabushiki Kaisha, Tokyo, Japan

[21] Appl. No.: 773,116

[22] Filed: Sep. 6, 1985

[30] Foreign Application Priority Data

Sep. 26, 1984 [JP] Japan ............................ 59-145627[U]

[51] Int. Cl.$^4$ .............................................. B09B 3/00
[52] U.S. Cl. ................................... 122/4 D; 110/204; 110/205; 110/206; 110/207; 431/115
[58] Field of Search ............... 110/204, 205, 206, 207; 431/115, 116; 122/4 D

[56] References Cited

U.S. PATENT DOCUMENTS 3,781,162 12/1973 Rudd et al. ...................... 110/206 X
4,286,548 1/1981 Brash ............................. 110/204 X
4,505,230 3/1985 Caplin ............................ 110/204 X
4,512,266 4/1985 Shigaki ............................... 110/204

OTHER PUBLICATIONS

"The Circulating Fluidized Bed for Utility Electric Power Generation", presented at a 1981 Joint Power Generation Conference, Oct. 4–8, 1981, St. Louis, Missouri.

Primary Examiner—Edward G. Favors

[57] ABSTRACT

Temperature of exhaust gases from a fluidized-bed boiler is lowered by means of heat exchange and dust entrained in the exhaust gases is efficiently collected by a dust collector. Part of the gases discharged from the dust collector are mixed with heated combustion air and are charged into a fluidized bed. Therefore, problems caused by dust entrained in the exhaust gases to be mixed with the combustion air as well as the cold corrosion problem can be substantially solved so that the technique for reducing the NO$_x$ contents in the exhaust gases from the fluidized-bed boiler is satisfactorily established.

1 Claim, 5 Drawing Figures

ID NO_x IN EXHAUST GASES FROM FLUIDIZED-BED BOILER

BACKGROUND OF THE INVENTION

The present invention relates to a method and apparatus for reducing $NO_x$ in exhaust gases from an exhaust-gas-recirculation type fluidized-bed boiler.

FIG. 1 shows a conventional fluidized-bed boiler and a designates a boiler main body. Combustion air c from a forced draft fan b, which inhales the atmospheric air, is charged into a lower air chamber d and rises through an air distributor e (air injection nozzles) with small holes to fluidize granular particles, thereby forming a fluidized bed f over the distributor e for combustion of coal or the like. Exhaust gases g are discharged through an induced draft fan h.

In the fluidized-bed boiler of the type described, it has been proposed to provide an exhaust-gas mixing pipe k so that part of the exhaust gases g are mixed with the combustion air c through a dust collector i and an exhaust-gas mixing fan j, thereby reducing the amount of $NO_x$ in the exhaust gases g.

However, in such conventional system, there arises a problem that the dust collector i, which is provided to prevent wear of the air distributor e due to dust, to prevent the clogging thereof with dust and to protect the fan j, becomes very large in size because only a mechanical dust collecting system can be employed due to high temperature of the exhaust gases g. Furthermore there is a problem that the dust collection efficiency is low. In addition, because of part of high-temperature exhaust gases g being mixed with the combustion air c almost at room temperature, the temperature of the gases g drops to a cold corrosion temperature range so that cold corrosion of the combustion air supply system results.

The present invention was made to overcome the above and other problems encountered in the conventional fluidized-bed boilers and has for its object to prevent wear by dust of pipe lines and equipment used to recirculate and mix the exhaust gases with the combustion air and to prevent cold corrosion, thereby reducing $NO_x$ in the exhaust gases from the fluidized-bed boiler.

The effects, features and advantages of the present invention will become more apparent from the following description of a preferred embodiment thereof taken in conjunction with the accompanying drawings.

DETAILED DESCRIPTION OF THE PREFERRED EMBODIMENT

Figure 1:
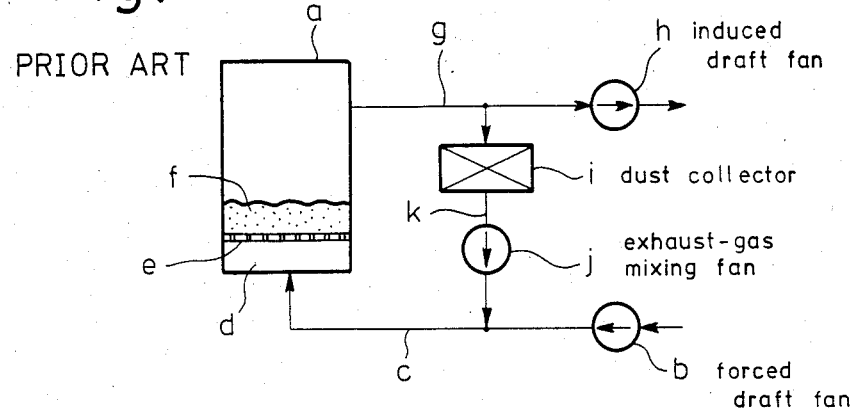
FIG. 1 is a flow chart of a conventional fluidized-bed boiler.
Figure 2:
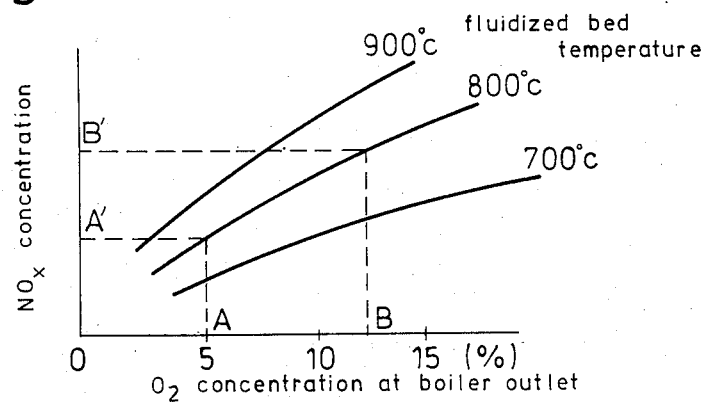
FIG. 2 is a graph showing the relationship between the $O_2$ concentration at the boiler outlet and the $NO_x$ concentration.
Figure 3:
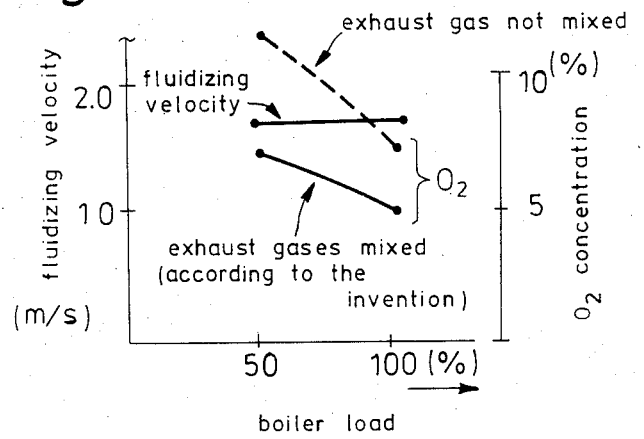
FIG. 3 is a graph showing the relationship between the boiler load on the one hand and the fluidizing velocity and the $O_2$ concentration in the boiler exhaust gases being mixed and the $O_2$ concentration in the boiler exhaust gases being not mixed on the other hand.

FIG. 2 shows the characteristic of $NO_x$ from a fluidized-bed boiler. The amount of $NO_x$ discharged is dependent upon the $O_2$ concentration in the boiler exhaust gases and the temperature of the fluidized bed. In order to maintain the combustion of the fluidized bed, a fluidizing velocity in excess of a minimum fluidizing velocity must be maintained as shown in FIG. 3 regardless of the boiler load, though it varies depending upon the sizes of granular particles in the fluidized bed.

Figure 4:
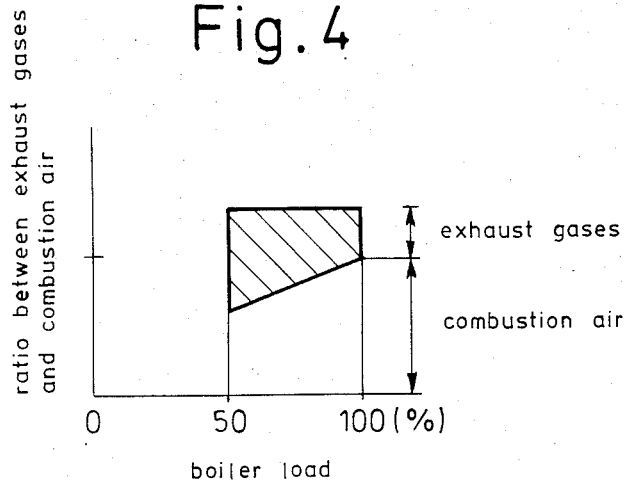
FIG. 4 is a graph illustrating the relationship between the boiler load on the one hand and mixing ratio between the combustion air and the exhaust gases on the other hand.

According to the present invention, in order to maintain the fluidized bed, inactive exhaust gases (mainly consisting of $N_2$ and $CO_2$) are mixed with the combustion air. When the exhaust gases are mixed with the combustion air, the $O_2$ concentration at the boiler outlet can be reduced as shown in FIG. 3 so that, as shown in FIG. 2, if the $O_2$ concentration is decreased from the point B to the point A at the fluidized bed temperature of 800° C., the $NO_x$ concentration can be reduced from the point B' to the point A'. The ratio between the combustion air and the exhaust gases should be selected depending upon a target amount of $NO_x$ emission and may be arbitrarily selected as shown in FIG. 4, for example. In this case, however, the maximum mixing ratio is determined as follows:

$$\frac{\text{amount of exhaust gases}}{\text{amount of combustion air} + \text{amount of exhaust gases}} \times 100 = 60(\%)$$

Next an apparatus capable of realizing the above-described underlying principle of the present invention will be described in detail.

Figure 5:
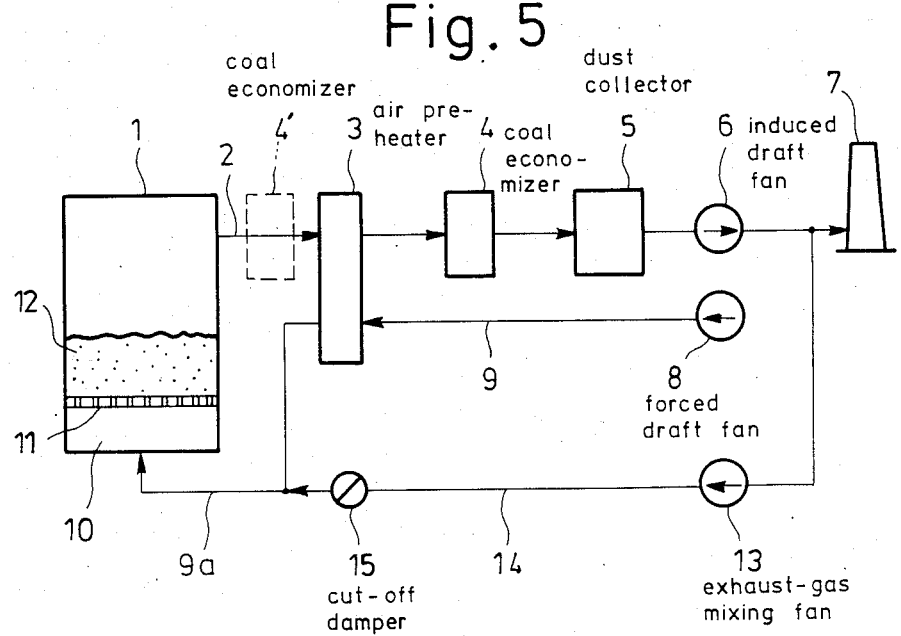
FIG. 5 is a flow chart of a preferred embodiment of an apparatus in accordance with the present invention.

FIG. 5 shows a preferred embodiment of this apparatus. The exhaust gases 2 from the boiler main body 1 flow through an air preheater 3 and coal economizer 4, which are heat exchangers, so that the temperature of the exhaust gases 2 is dropped. Thereafter the gases flow through a dust collector 5 and an induced draft fan 6 to a stack 7. The temperature of the combustion air 9 from the forced draft fan 8, which inhales the atmospheric air, flows through the air preheater 3 so that the temperature of the combustion air is raised. Thereafter the combustion air is charged into the air chamber 10 at the lower portion of the boiler main body 1, whereby the fluidized bed 12 is formed over the gas distributor 11.

In addition to the above-described equipment, there is provided an exhaust-gas mixing pipe line 14 so that part of the exhaust gases 2 from the outlet of the induced draft fan 6 is mixed through an exhaust-gas mixing fan 13 with the air 9a which has been heated by the air preheater 3 and is to be supplied to the boiler main body 1. A cut-off damper 15 is provided in the pipe line 14.

As described above, the combustion air 9 from the fan 8 is made to flow through the air preheater 3 and the preheated air 9a is mixed with part of the exhaust gases 2 through the exhaust-gas mixing pipe line 14 so that, in the mixing step, the sudden temperature drop of the exhaust gases mixed can be prevented and consequently cold corrosion can be avoided.

Since the exhaust gases 2 are made to flow through the air preheater 3 and coal economizer 4 so as to recover heat, the temperature of the exhaust gases is sufficiently lowered so that a cold electrostatic precipitator or bag house may be used as the dust collector 5. As a result, the apparatus can be made compact in size and high dust collection efficiency can be ensured. Since dust in the exhaust gases is satisfactorily removed by the dust collector 5 and then part of the exhaust gases are recirculated and mixed through the exhaust-gas mixing pipe 14 with the combustion air, wear and clogging by dust of the pipe lines and equipment can be avoided.

It is understood that the present invention is not limited to the preferred embodiment described above and that various modifications may be effected within the true spirit of the present invention. For instance, the coal economizer may be interposed between the boiler main body 1 and the air preheater 3 as indicated by 4' in FIG. 5. Furthermore, part of the exhaust gases to be mixed with the combustion air may be withdrawn from any arbitrary point downstream of the dust collector 5.

The effects, features and advantages of the present invention may be summarized as follows:

(i) The exhaust gases from the fluidized-bed boiler are made to flow through the heat exchangers such as air preheater and coal economizer so that the temperature of the exhaust gases can be sufficiently lowered. As a result, a cold electrostatic precipitator or bag house can be used to collect dust in the exhaust gases. Therefore the dust collector can be made compact in size and have a higher degree of dust collection efficiency.

(ii) Since dust collection efficiency is increased, the amount of dust entrained in the exhaust gases is considerably decreased so that the problems of wear and clogging by dust of the pipe lines and equipment can be overcome.

(iii) Part of the exhaust gases are mixed with the combustion air which has been preheated so that cold corrosion due to the temperature drop of the exhaust gases mixed with the preheated combustion air can be avoided.

(iv) Since the dust collection efficiency is increased, various problems caused by dust entrained in the exhaust gases can be overcome and the problem of cold corrosion can be also solved. Thus, $NO_x$ contents in the exhaust gases from the fluidized-bed boiler can be satisfactorily reduced.

What is claimed is:

1. A method for reducing $NO_x$ in exhaust gases from a fluidized-bed boiler comprising the steps of:

charging the exhaust gases from said fluidized-bed boiler through heat exchanger means comprising an air preheater and a coal economizer into a dust collector and then to an induced draft fan;

flowing combustion air from a forced draft fan through said air preheater so that said combustion air is heated;

supplying the heated combustion air to said fluidized bed boiler; and mixing part of the exhaust gases which are withdrawn at a point downstream of said dust collector with said heated combustion air through an exhaust-gas mixing fan.

* * * * *